Oct. 2, 1962     C. J. CHAPLIN     3,056,232
MOLDED PULP ARTICLE
Original Filed June 3, 1957
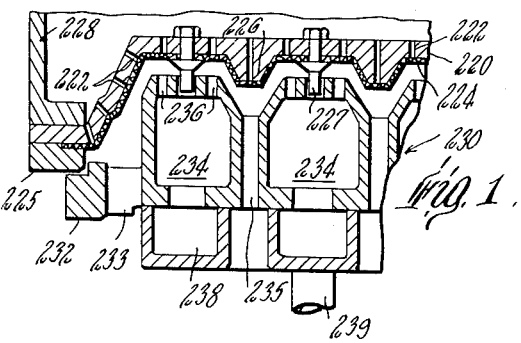
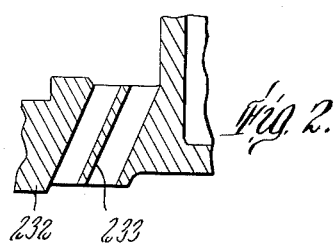
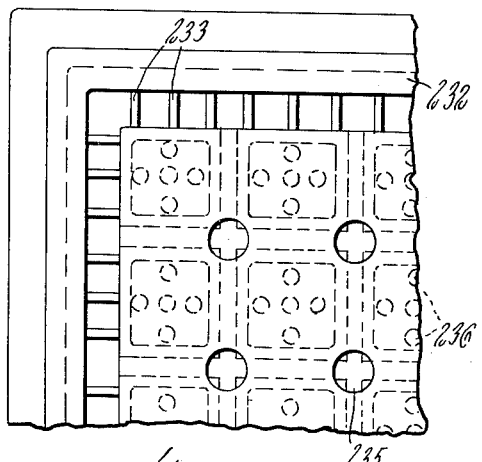
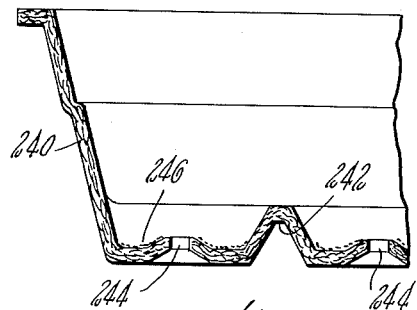
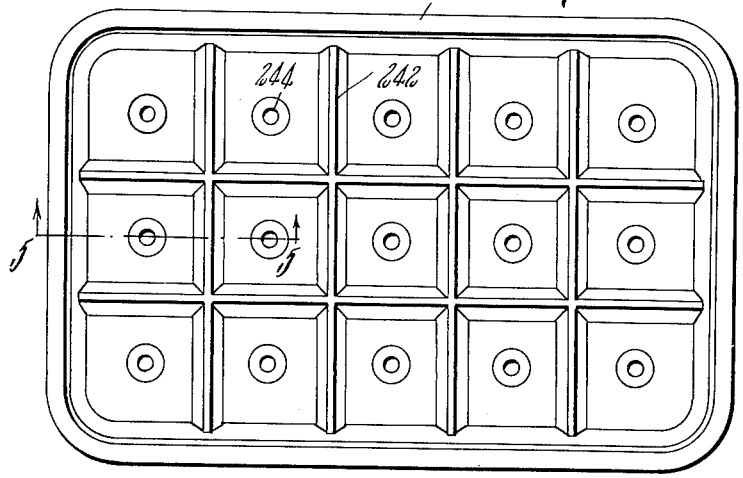

United States Patent Office 3,056,232
Patented Oct. 2, 1962

3,056,232
MOLDED PULP ARTICLE
Charles J. Chaplin, South Portland, Maine, assignor, by mesne assignments, to Diamond National Corporation, New York, N.Y., a corporation of Delaware
Original application June 3, 1957, Ser. No. 663,271, now Patent No. 3,016,090, dated Jan. 9, 1962. Divided and this application Sept. 23, 1958, Ser. No. 767,075
2 Claims. (Cl. 47—34)

This invention relates to molded fibrous articles and is a division of application Serial No. 663,271, filed June 3, 1957, now United States Letters Patent No. 3,016,090, issued January 9, 1962.

Reference may be had to the above-mentioned patent for details of typical apparatus and methods for producing the molded pulp article of this invention.

A primary object of the present invention is to provide a novel molded pulp article for use as a seedling tray.

A more particular object of the present invention is to provide a novel multi-plant container produced from molded pulp and facilitating the propagation and subsequent separation of individual seedlings.

Other objects and the many attendant advantages of the present invention will become apparent upon consideration of the following specification and accompanying drawings, wherein:

FIG. 1 shows a die arrangement for forming or molding a multiple-plant container, whereby growth and/or other materials can be introduced in controlled amounts into the molded structure in certain selected locations;

FIG. 2 shows a vane arrangement whereby the flow of liquid fibrous materials is directed along the walls more or less parallel to the container edge and bottom rather than in a vertical direction, or directly towards the edge of the article or the bottom of the article;

FIG. 3 is a plan view of the showing of FIG. 1 showing how the flow of fibrous materials is directed along or parallel to the raised sections in the bottom wall of the container, rather than directly vertical towards said walls;

FIG. 4 illustrates a plan view of a multi-plant container produced in accordance with the teachings and functions of the die structures of FIGS. 1, 2 and 3; and FIG. 5 is a sectional view, somewhat enlarged, taken substantially on the plane of line 5—5 of FIG. 4.

The article illustrated in FIGS. 4 and 5 is utilized for the growing of a number of plants, shrubs, etc., it is possible to build up these structures with different types of materials for strength, plant growth acceleration, etc.

In the manufacture of multi-plant containers as compared to an article for a single plant or shrub, it is customary to utilize a rectangularly shaped container containing a plurality of plants which are subsequently removed, individually, and transplanted. In such a container it is desirable that the roots of each plant do not intermingle with the roots of adjacent plants, so that when each plant is removed for transplanting, its root structure will be disturbed as little as possible. It is also desirable under certain conditions, to add plant growth material to the container in such a manner that the roots can absorb most or all of this growth material without penetrating or injuring the container walls.

In FIGS. 4 and 5, respectively, there is shown a plan and a cross-section of the article, somewhat enlarged, and there is indicated around the edge and outer walls of the container, the strong fibrous material 240 usually employed for the primary deposit or formation. However, in each of the depressions in which a plant or seedling will be located, there is indicated at 246, an integralized growth material which may be deposited immediately after the initial surface deposit of the fibrous materials has been suction-formed, and this secondary deposit of growth material can be built up to any desired degree in thickness directly under each plant or in the bottom of each of the several pockets.

As it is usually desirable to have perforations or openings 244 in the bottom of a container for this purpose, directly under each of the individual plants or seedlings, a pin 227 is secured to the die 220 by any suitable means, and also, the pin serves to clamp the central portions of the wire covering 224 in place, providing thereby a slightly raised section in the inside of the container, thereby retaining any water or other liquid in the bottom of each individual plant pocket, but limiting the depth of such liquid to the amount by which the opening is raised over the bottom area.

There is a very definite advantage to this method and the article produced by it, in that the roots of each of the several seedlings or plants tend to concentrate themselves in each of the several pockets due to the nutriment of growth material in each pocket, and not spread across the rib structure of the article which separates the pockets. The rib structure in the bottom of the container also makes it easier to remove each plant or seedling without disturbing adjacent plants.

With the method and apparatus disclosed in United States Letters Patent No. 3,016,090, it is possible to have a strong fibre outer shell or section over the entire article, and an extra strong fibre rim for the entire thickness of the article at the top edge, but still have peat, peat moss, or other growth material deposited on the inside to any desired thickness or amount.

Relatively deep rectangular articles, illustrated in FIGS. 4 and 5, may be similarly molded as may be seen by referring to FIGS. 1–3 wherein is shown a die structure 220 having openings 222 therethrough and covered with a fine wire screen 224 as shown. The wire screen is held in place by a clamp ring 225 and the entire die structure is mounted in a suitable die carrier 228 for periodic immersion in a liquid-fibre mixture in a way well known in the art. Preferably, ribs 226 are provided in the bottom of said die forming depressions having posts 227 therein for forming perforations 244 in the article.

Associated with the forming die structure 220, when it is in forming or molding position, is a grid-like structure generally indicated at 230 which consists of an edge reinforcing ring 232, and a plurality of distributing cavities or chambers 234 spaced from one another by openings 235, which chambers communicate to certain areas of the surface of the forming die 220 by means of openings 236 therein. Suitable liquid-fibrous and/or other mixtures can be supplied to the various chambers 234 by any suitable means such as a manifold 238, to which the liquid materials can be supplied by any suitable means such as a pipe 239.

The ring 232 provided to reinforce the edge of the article is connected to the internal liquid distributing structure 230 by means of a series of vanes 233, these being located at an angle or incline as indicated in FIG. 2. As the liquid-fibre mixture is drawn to the surface of the die by suction applied to the rear face of this die, the flow of liquid mixture through the space between the vanes 233 tends to deflect this mixture lengthwise or crosswise of the container, thereby effecting better strength distribution of fibres at the edge of the container and on its side and end walls.

In operation, the forming or molding die 220 is immersed in a liquid-fibre mixture by any satisfactory means well known in the art, and suction is applied to the rear face of this die. At the same time, the edge ring 232 with the other structure illustrated in FIGS. 1–3 is in place and the initial fibrous deposit, as far as the edge and side walls of the article are concerned, is drawn through between the ribs 233 and deflected as previously described, and, also, through the openings 235 between the chambers, thus providing a liquid-fibre mixture for depositing over the entire surface of the die during the initial stages of formation. At some predetermined time during this formation, a secondary liquid-fibre mixture is inserted through pipe 239 and manifold 238, introduced into chambers 234 and ejected towards and adjacent to the depressed areas of the die surface between ribs 226 through openings 236. At the same time, the initial fibre mixture or primary mixture is continuing on the rim and side walls of the article, and also on the rib structure or raised portions 226 of the die, which are for the purpose of defining a series or plurality of separate areas or portions of the bottom of the container, in the depressions of which can be deposited about posts 227 by the secondary means already described, a plant growth or other material.

When the general or main fibre structure has been built up around the edge, rim and rib portions of the container, and a sufficient amount of secondary fibrous or growth material has been deposited in the several pockets or depressions in the die, the entire structure is removed from the liquid-fibre mixture, and flow of secondary mixture through pipe 239 and chambers 234 and then openings 236, is cut off. As formation is usually in a vertical or upward direction, the cutting off of the secondary mixture from pipe 239 automatically keeps the chambers full, without any of this mixture escaping from the chambers.

The article so formed as shown in FIGS. 4 and 5 is relatively deep and of rectangular shape with side walls and a bottom having a grid of separating ribs 242 with perforations 244 in the depressions therebetween, and with the secondary fibrous or growth material forming an inner layer 246 within such depressions.

Modifications of this invention not herein described within the spirit thereof and the scope of the appended claims will occur to those skilled in the pulp molding and related arts.

I claim:

1. A molded pulp seedling tray of generally rectangular configuration having a grid of integrally molded upstanding ribs on the interior bottom thereof defining a plurality of compartments, said structure being integralized, and each of said compartments having integrally molded therewith a plant treatment material.

2. A molded pulp container comprising at least two juxtaposed layers of integrated fiber material, each layer of material having a different density and porosity and being inseparable from the other, one of said layers of integrated material comprising the outer surface of said container and being substantially impervious to liquids, the other layer of integrated material being pervious to liquids, and a plant treatment material impregnated in said other layer of integrated material, said container comprising a tray including upstanding side walls and a transverse bottom, said bottom including a grid of integrally molded, vertical ribs, forming a plurality of compartments for receiving an individual seedling therein, the bottom of each compartment including an upstanding central projection forming a recess thereabout whereby the impregnate plant treatment material in solution is concentrated in said recess to promote root growth only in the individual compartments and to facilitate transplanting of seedlings from adjacent compartments.

References Cited in the file of this patent

UNITED STATES PATENTS

| 1,226,311 | Clifford | May 15, 1917 |
|---|---|---|
| 1,828,448 | Seidel | Oct. 20, 1931 |
| 1,974,898 | Rutledge | Sept. 25, 1934 |
| 2,022,548 | Otwell | Nov. 26, 1935 |
| 2,094,513 | Wilson | Sept. 28, 1937 |
| 2,140,932 | Avery | Dec. 20, 1938 |
| 2,237,048 | Carter | Apr. 1, 1941 |
| 2,274,095 | Sawyer | Feb. 24, 1942 |
| 2,455,295 | Cox | Nov. 30, 1948 |
| 2,629,533 | Chaplin | Feb. 24, 1953 |
| 2,715,458 | Polglase | Aug. 16, 1955 |
| 2,728,169 | Spengler | Dec. 27, 1955 |
| 2,738,914 | Hatch | Mar. 30, 1956 |
| 2,780,401 | Stevens | Feb. 5, 1957 |
| 2,848,842 | Tennant | Aug. 26, 1958 |
| 2,858,647 | Cotton | Nov. 4, 1958 |
| 2,920,805 | Reifers | Jan. 12, 1960 |

FOREIGN PATENTS

| 737,660 | Great Britain | Sept. 28, 1955 |
|---|---|---|

OTHER REFERENCES

Hackh's Chemical Dictionary, Third edition, published by Blakiston (Phila.) 1944. Pages 614 and 615 relied upon.

Condensed Chemical Dictionary, Fifth edition, published by Reinhold (N.Y.) 1956. Page 821 relied upon.